United States Patent [19]  [11] Patent Number: 4,486,651
Atsumi et al.  [45] Date of Patent: Dec. 4, 1984

[54] CERAMIC HEATER

[75] Inventors: Kinya Atsumi, Toyohashi; Novuei Ito, Aichi, both of Japan

[73] Assignee: Nippon Soken, Inc., Nishio, Japan

[21] Appl. No.: 460,651

[22] Filed: Jan. 24, 1983

[30] Foreign Application Priority Data

Jan. 27, 1982 [JP] Japan .................. 57-11239
Mar. 3, 1982 [JP] Japan .................. 57-34163
Jul. 5, 1982 [JP] Japan .................. 57-117434

[51] Int. Cl.$^3$ .............................. H05B 3/10
[52] U.S. Cl. ........................ 219/553; 123/145 A; 219/270; 219/541; 252/518; 338/330; 361/266
[58] Field of Search .............. 219/267, 270, 541, 553, 219/544; 123/145 R, 145 A, 146; 361/264, 265, 266; 431/262; 373/134; 252/516, 518; 338/314, 330; 428/213; 313/131 R

[56] References Cited

U.S. PATENT DOCUMENTS

| 2,955,145 | 10/1960 | Schrewelius | 252/518 X |
| 3,002,936 | 10/1961 | Allenbach et al. | 252/518 |
| 3,248,346 | 4/1966 | Amberg | 252/518 |
| 3,321,727 | 5/1967 | Schrewelius | 338/330 |
| 3,454,345 | 7/1969 | Dyre | 252/518 X |
| 3,875,476 | 4/1975 | Crandall et al. | 338/330 X |
| 3,875,477 | 4/1975 | Fredriksson et al. | 361/264 |
| 3,895,219 | 7/1975 | Richerson et al. | 219/553 |
| 4,107,510 | 8/1978 | Tombs et al. | 219/270 |
| 4,320,165 | 3/1982 | Cash | 428/213 |
| 4,357,526 | 11/1982 | Yamamoto et al. | 219/544 |

Primary Examiner—Volodymyr Y. Mayewsky
Attorney, Agent, or Firm—Cushman, Darby & Cushman

[57] ABSTRACT

A ceramic heater comprising a supporting member made of an electrically insulating ceramic and a heater element made of a ceramic having excellent oxidization resistance, thermal shock resistance and high bending strength at a high temperature is disclosed. The heater element is formed by sintering a mixture composed of $MoSi_2$ and 10 to 70 mol % of $Si_3N_4$. By adding 3 to 10 mol % of at least one material selected from the group consisting of $Al_2O_3$, a mixture of $Al_2O_3$ and MgO and $MgAl_2O_4$ to the above mixture, a heater element having a sufficient sintering degree can be obtained even by atmospheric sintering.

5 Claims, 7 Drawing Figures

CERAMIC HEATER

BACKGROUND OF THE INVENTION

The present invention relates to a ceramic heater employed as a glow plug in a diesel engine or the like, especially to a ceramic heater provided with a heater element having excellent oxidization resistance and thermal shock resistance, and high bending strength at a high temperature.

Conventionally, the heater element has been made of heat resistant alloy such as nickel-chrome alloy, iron-chrome-aluminum alloy or ceramic such as silicon carbide or molybdenum silicide.

However, the heater element made of the above described heat resistant alloy has a problem to be oxidized or melt at a temperature above 1100° C.

The heater element made of silicon carbide can be used at a temperature under 1600° C. but the specific resistance thereof is too high for making the heater element small.

The heater element made of molybdenum silicide is superior in oxidization resistance but inferior in bending strength at a high temperature and thermal shock resistance.

Therefore, the heater element made of the above described material cannot be used in an atmosphere of which temperature drastically changes in a high temperature range.

The heater, for example a glow plug which is used for preheating an air-fuel mixture at a starting time of a diesel engine, is especially required to exhibit a rapidly heating property that is to generate heat immediately upon receiving an electric current in order to improve the startability of an engine.

Most of the conventional glow plugs for diesel engines are of sheath type. In the glow plug of this type, a heating wire such as nickel-chromium alloy is wound like a coil and is disposed within a bottomed outer casing made of thermal corrosion resistant ally such as stainless steel, or inconel. Within the outer casing, an insulating material such as magnesium oxide is charged so as to surround the coil shaped heating wire.

In this glow plug, the heat of the heating wire is transmitted to the outer casing through the insulating material so that it takes a time to heat the surface of the outer casing enough to ignite the air-fuel mixture of a diesel engine. Therefore, the glow plug of this type is short of a rapidly heating property so that speedy startability of a diesel engine cannot be obtained.

In order to overcome this problem, it has been proposed to dispose a heater element made of heat resistant metal such as tungsten, nickel, platinum or molybdenum on an outer surface of the glow plug.

The glow plug of this type exhibits a rapidly heating property but various properties are lowered at about 1000° C. due to the oxidization except for that comprising the heater element made of platinum.

Therefore, the glow plug of this type is not practical.

And platinum is too expensive to be applied to the mass production.

Furthermore, when the heater element is formed of a sintered body of ceramic such as silicon carbide or molybdenum silicide, the sintering operation has been conventionally performed under pressure by means of a hot press or hot isostatic press. Therefore, conventionally, it is difficult to produce a heater element made of a ceramic sintered body having a complex shape.

From the above circumstances, it has been required to produce a heater element made of a ceramic sintered body which has excellent oxidization resistance, and thermal shock resistance and high bending strength at a high temperature by atmospheric sintering (pressureless sintering).

SUMMARY OF THE INVENTION

Accordingly, one object of the present invention is to provide a ceramic heater comprising a heater element made of a ceramic sintered body, which has excellent oxidization resistance and thermal shock resistance and high bending strength at a high temperature.

Another object of the present invention is to provide a ceramic heater comprising a heater element made of a ceramic sintered body which is disposed on an outer surface thereof and has an excellent rapidly heating property.

Still another object of the present invention is to provide a ceramic heater comprising a heater element made of a ceramic sintered body which has excellent oxidization resistance, thermal shock resistance and high bending strength at a high temperature and can be obtained by atmospheric sintering.

The ceramic heater of the present invention comprises a supporting member made of an electrically insulating ceramic and a heater element made of a ceramic having excellent oxidization resistance, thermal shock resistance and high bending strength at a high temperature. The heater element is formed by sintering a mixture composed of 90 to 30 mol% of $MoSi_2$ and 10 to 70 mol% of $Si_3N_4$ in a non-oxidized atmosphere.

Furthermore, by adding 3 to 10 mol% of at least one material selected from the group consisting of $Al_2O_3$, a mixture of $Al_2O_3$ and $MgO$ and $MgAl_2O_4$ to the above mixture, a heater element having a sufficient sintering degree can be obtained even by atmospheric sintering.

The heater element of the present invention is superior in thermal shock resistance and oxidization resistance and has a high bending strength at a high temperature. Therefore, the heater element of the present invention can be disposed on an outer surface of the supporting member with excellent durability so that the ceramic heater having an excellent rapidly heating property can be obtained.

DESCRIPTION OF THE EMBODIMENTS

Figure 1:
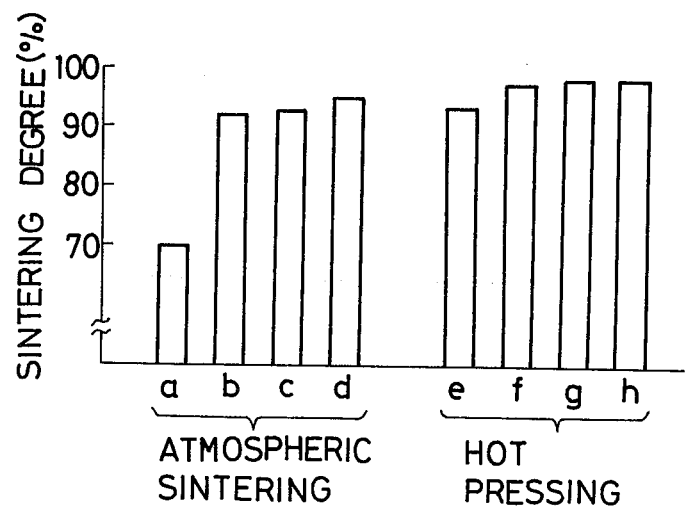
FIG. 1 is a graph showing sintering degree of several samples.

The present inventors have made an oxidization resistance test on various high melting temperature materials for use as a heater element. In this test, various kinds of material powder were sintered by hot pressing to the density of not less than 90% of theoretical density and cut into a predetermined shape and size, respectively. The obtained samples were maintained within an electric furnace which is kept at 1000° C., for 15 hours. Then, the samples were washed by acetone and the weight change of each sample was examined. The result of the oxidization resistance test is shown in Table 1.

TABLE 1

| Material | SiC | TiC | $ZrB_2$ | $MoB_2$ | $ZrSi_2$ | $MoSi_2$ | Ni—Cr |
|---|---|---|---|---|---|---|---|
| Weight change (%) | $2.0 \times 10^{-3}$ | 5.75 | 0.56 | −10.8 | 34.4 | $4.1 \times 10^{-2}$ | 0.91 |
| Initial specific resistance (Ω-cm) | 200 | $2.3 \times 10^{-4}$ | $1.5 \times 10^{-4}$ | $3.0 \times 10^{-4}$ | $4.2 \times 10^{-5}$ | $2.8 \times 10^{-4}$ | $3.2 \times 10^{-4}$ |
| Temperature coefficient of resistance ($deg^{-1}$, $10^2$) | 0.26 | 1.8 | 2.3 | — | 1.30 | 6.38 | 0.1 |

In Table 1, the initial specific resistance and the temperature coefficient of resistance of each sample are also shown. In this test, nickel-chromium alloy on the market was used as Ni-Cr material.

As is apparent from Table 1, SiC and $MoSi_2$ exhibited excellent oxidization resistance while the other material were considerably oxidized.

However, the initial specific resistance of SiC was very high. Therefore, the heater element made of SiC becomes too large to be used practically.

In table 1, the weight change of $MoB_2$ was on the minus side. This fact seems that the oxidized portion of $MoB_2$ was peeled off during the washing operation by acetone.

From the above test, it has been clarified that $MoSi_2$ is a suitable material for a heater element in oxidization resistance and specific resistance.

Furthermore, the temperature coefficient of resistance of $MoSi_2$ is especially large as compared with that of the other material.

The heater element made of $MoSi_2$ generates heat immediately upon receiving an electric current, and as the temperature of the heater element rises, the resistance thereof increases to prevent the electric current from excessively increasing.

Therefore, the heater comprising a heater element made of $MoSi_2$ is suitable to the glow plug which is required to exhibit a rapidly heating property at an engine starting time.

As described above, $MoSi_2$ has advantages of excellent oxidization resistance, low specific resistance and large temperature coefficient of resistance.

However, the bending strength at a high temperature of $MoSi_2$ is low and the coefficient of thermal expansion thereof is as large as $7.7 \times 10^{-6\circ}$ $C.^{-1}$ so that thermal shock resistance of $MoSi_2$ is inferior.

The present inventors have overcome the above described problem by mixing $Si_3N_4$ with $MoSi_2$.

The weight change, bending strength at a high temperature, coefficient of thermal expansion and initial specific resistance of various kinds of mixture of $MoSi_2$ and $Si_3N_4$ were shown in Table 2.

The test conditions are as follows:
Oxidization resistance test: 1000° C. × 15 hr in the air.
Bending strength at a high temperature:
The load applied when each sample of $40 \times 3 \times 4$ mm is broken or deformed upon the three points bending test at a load speed of 0.5 mm/min. at 1300° C. in the air
Coefficient of thermal expansion:
Average coefficient of thermal expansion in the temperature range from the room temperature to 800° C.

TABLE 2

| Composition Ratio (mol %) | | | | | | | | | | | |
|---|---|---|---|---|---|---|---|---|---|---|---|
| $MoSi_2$ | 100 | 90 | 80 | 70 | 60 | 50 | 40 | 30 | 20 | 10 | 0 |
| $Si_3N_4$ | 0 | 10 | 20 | 30 | 40 | 50 | 60 | 70 | 80 | 90 | 100 |
| Oxidization resistance test Weight change (%) | 0.03 | 0.04 | 0.03 | 0.04 | 0.04 | 0.04 | 0.03 | 0.05 | 0.04 | 0.04 | 0.05 |
| Bending strength at a high temperature ($Kg/cm^2$) | 5 | 10 | 13 | 15 | 19 | 27 | 29 | 36 | 42 | 51 | 60 |
| Coefficient of thermal expansion (°$C.^{-1}$) | $7.7 \times 10^{-6}$ | $7.1 \times 10^{-6}$ | $6.3 \times 10^{-6}$ | $5.7 \times 10^{-6}$ | $5.0 \times 10^{-6}$ | $4.4 \times 10^{-6}$ | $3.9 \times 10^{-6}$ | $3.5 \times 10^{-6}$ | $3.2 \times 10^{-6}$ | $3.0 \times 10^{-6}$ | $2.8 \times 10^{-6}$ |
| Initial specific resistance (Ω-cm) | $2.8 \times 10^{-4}$ | $1.4 \times 10^{-3}$ | $3.5 \times 10^{-3}$ | $1.5 \times 10^{-2}$ | $4.0 \times 10^{-2}$ | $1.2 \times 10^{-1}$ | $4.0 \times 10^{-1}$ | 2.0 | 38 | $4.2 \times 10^{3}$ | ∞ |

As is apparent from Table 2, the weight Change due to oxidization was scarcely absorbed in any sample.

The bending strength at a high temperature rapidly increased as the mixing ratio of $Si_3N_4$ increased while the coefficient of thermal expansion decreased as the mixing ratio of $Si_3N_4$ increased. However, when the mixing ratio of $Si_3N_4$ exceeds 70 mol%, the specific resistance increases too large to be used as the material of the heater element.

By mixing only a small amount of $Si_3N_4$ with $MoSi_2$, the bending strength of the obtained sintered body can be made high while the coefficient of thermal expansion thereof can be made small, as compared with the sintered body of $Si_3N_4$ only.

Preferably, not less than 10% of $Si_3N_4$ should be mixed with $MoSi_2$.

As described above, by mixing 10 to 70 mol% of $Si_3N_4$ with $MoSi_2$ and sintering the mixture, the heater element having excellent oxidization resistance and thermal shock resistance and high bending strength at a high temperature can be obtained.

Conventionally, the sintering operation has been performed under pressure by means of the hot press, hot isostatic press or the like.

By this sintering method, a sintered body having high sintering degree can be obtained but it is difficult to form a sintered body having a complex shape.

When the ceramic material is sintered under atmospheric pressure, the sintered body having a complex shape can be easily formed but the sintering degree thereof is low.

The present inventors have examined on the sintering degree of the sintered body formed by atmospheric sintering the mixture of $MoSi_2$ and $Si_3N_4$. As a result, the sintering degree was as low as 70% or so.

The present inventors have further examined and studied on the sintering operation and confirmed that by mixing at least one of $Al_2O_3$, a mixture of $Al_2O_3$ and MgO and $MgAl_2O_4$ with the mixture of $MoSi_2$ and $Si_3N_4$, high sintering degree can be obtained even by atmospheric sintering.

FIG. 1 shows a result of the inventor's examination.

Samples a to d were obtained by atmospheric sintering and e to h were obtained by hot pressing.

Each of Samples a and d was made of 50 mol% of $MoSi_2$ and 50 mol% of $Si_3N_4$, b and f were made of 45 mol% of $MoSi_2$, 50 mol% of $Si_3N_4$ and 5 mol% of $Al_2O_3$, respectively, c and g were made of 45 mol% of $MoSi_2$, 50 mol% of $Si_3N_4$ and 5 mol% of the mixture of MgO and $Al_2O_3$, respectively, and d and h were made of 45 mol% of $MoSi_2$, 50 mol% of $Si_3N_4$ and 5 mol% of $MgAl_2O_4$, respectively.

The sintering operation for a to d was performed in an atmosphere of nitrogen under one atmospheric pressure at 1600° C. for 2 hours while that for e to h was performed under pressure of 150 Kg/cm² at 1600° C. for 1 hour.

As is apparent from FIG. 1, Samples b to d exhibited remarkably excellent sintering degree nearly equal to that of Sample e, as compared with that of Sample a.

And Samples f to h exhibited more excellent sintering degree as compared with that of Sample e.

From the above experimental result, it has been clarified that by mixing only a small amount of at least one material out of $Al_2O_3$, the mixture of $Al_2O_3$ and MgO and $MgAl_2O_4$, with the mixture of $MoSi_2$ and $Si_3N_4$, the sintering degree of the sintered body can be made high even by atmospheric sintering.

Table 3 shows the weight change of the sintered bodies made of the mixture of $MoSi_2$, $Si_3N_4$ and $MgAl_2O_4$ due to oxidization. And bending strength at a high temperature is also shown.

TABLE 3

| Composition ratio (mol %) | $MoSi_2$ | 30 | 70 |
|---|---|---|---|
| | $Si_3N_4$ | 65 | 25 |
| | $MgAl_2O_4$ | 5 | 5 |
| Weight change (%) | | $3.7 \times 10^{-2}$ | $3.8 \times 10^{-2}$ |
| Bending strength (Kg/mm²) | | 41 | 22 |

As is apparent from Table 3, excellent oxidization resistance and high bending strength at a high temperature can be obtained.

The upper limit of the above additive such as $Al_2O_3$, the mixture of $Al_2O_3$ and MgO, or $MgAl_2O_4$ is 10%. If the amount of the above additive exceeds 10%, the bending strength at a high temperature is lowered.

Preferably, not less than 3% of the above additive should be mixed with the mixture of $MoSi_2$ and $Si_3N_4$.

Figure 2:
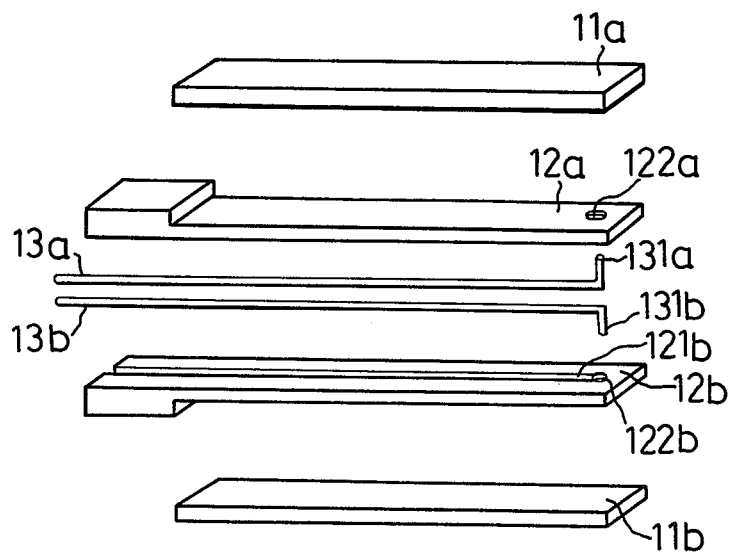
FIG. 2 is a view illustrating the construction of a first embodiment of the ceramic heater according to the present invention.

FIG. 2 illustrates a first embodiment of a ceramic heater according to the present invention.

In the first embodiment, the ceramic heater is composed of heater elements 11a, 11b each of which is made of a ceramic sintered plate formed by sintering the mixture composed of 10 to 70 mol% of $Si_3N_4$ with the remainder being $MoSi_2$, supporting members 12a, 12b, each of which is made of an electrically insulating ceramic sintered plate such as a $Si_3N_4$ sintered plate or $Al_2O_3$ sintered plate and metallic wires 13a, 13b made of metal such as tungsten.

In each of the supporting members 12a, 12b, a stepped portion is formed so as to form a thick walled portion in the base end thereof.

In the surface of the supporting member 12b, a groove 121b is formed in the longitudinal direction.

The top end of each of the metallic wires 13a, 13b is bent at a right angle to form a bent portion 131a or 131b.

When the ceramic heater 1 is assembled, the metallic wires 13a, 13b are set within the groove 121b of the supporting member 12b. Then, the supporting member 12a is laid on the supporting member 12b. At this time, the bent portions 131a, 131b of the metallic wires 13a, 13b are inserted into holes 122a, 122b each of which is formed in a top end of each of the supporting members 12a, 12b so as to penetrate therethrough.

Next, the heater elements 11a, 11b are laid on the stepped portions formed in the supporting members 12a, 12b and sintered while applying pressure in the thickness direction of the ceramic heater (hot pressing).

As a result, the heater element 11a, the supporting members 12a, 12b and the heater element 11b are integrally joined to one another.

Each of the metallic wires 13a, 13b is electrically connected to a positive electrode of a battery while the outer surface of each of the heater elements 11a, 11b is electrically connected to a negative electrode of the battery.

In operation, an electric current flows to the top end of each of the heater elements 11a, 11b through the metallic wires 13a, 13b so that the heater elements 11a, 11b generate heat.

According to the present embodiment, each of the heater elements 11a, 11b is made of a sintered body of a mixture of 10 to 70 mol% of $Si_3N_4$ with the remainder being $MoSi_2$. Therefore, excellent oxidization resistance and thermal shock resistance, and high bending strength at a high temperature can be obtained.

Even after the heater element made of the above described sintered body is directly exposed in an atmosphere as high as 1300° C., high bending strength is not lost and excellent oxidization resistance and thermal shock resistance can be maintained for a long period.

Therefore, the ceramic heater of the first embodiment can operate with durability especially where high banding strength at a high temperature and a rapidly heating property are required.

Figure 3:
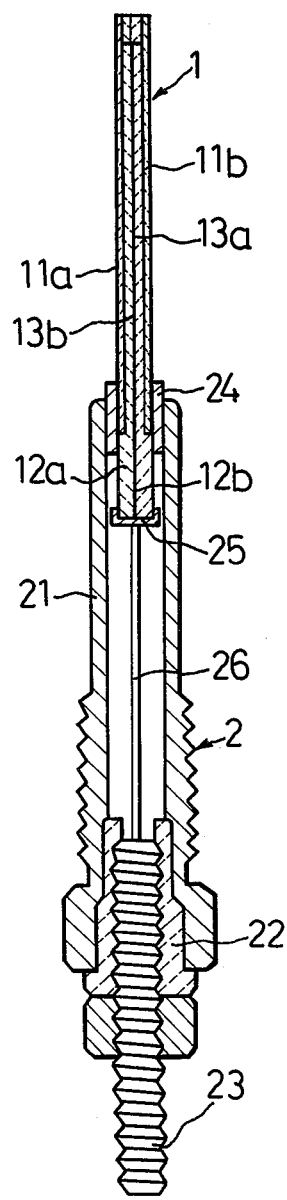
FIG. 3 is a longitudinal sectional view of a glow plug wherein the ceramic heater of the first embodiment is used.

FIG. 3 illustrates a glow plug for a diesel engine on which the ceramic heater of the first embodiment is mounted.

An attaching portion 2 comprises a metallic housing 21 to be mounted to an engine head, a positive terminal 23 which is inserted into the housing 21 and fixed thereto through an insulating material 22. The base end of the ceramic heater 1 is inserted into an open end of the housing 21 and the heater elements 11a, 11b are fixed to the open end of the housing 21 through a metallic cover 24. The heater elements 11a, 11b are grounded through the metallic cover 24.

To the base end surface of each of the supporting members 12a, 12b, a metallic cap 25 is joined so as to contact with the metallic wires 13a, 13b. The metallic cap 25 is electrically connected to the positive terminal 23 through a stainless steel wire 26.

In operation, an electric current supplied from the positive terminal 23, flows into the top end of each of the heater elements 11a, 11b through the stainless steel wire 26, the metallic cap 25, the metallic wires 13a, 13b and the supporting members 12a, 12b. Then, the electric current flows into the housing 21 though the heater elements 11a, 11b and the cover 24 and is grounded.

Assuming that the resistance of the heater elements 11a, 11b of the glow plug having the above described structure is $0.1\Omega$, and an electric voltage of 12 V is applied to the heater elements 11a, 11b, the time taken for rising the temperature of the outer surface of the heater elements 11a, 11b to 800° C. was measured. As a result, the time as short as 1.4 second can be obtained.

Furthermore, the resistance change of the heater elements 11a, 11b after a durability test, was measured. This test was conducted by heating the outer surface of the heater elements 11a 11b at 1000° C. and supplying an electric current thereto for 200 hours. As a result of the durability test, the resistance of the heater elements 11a, 11b did not change at all. The oxidization resistance was not lowered, too.

Figure 4:
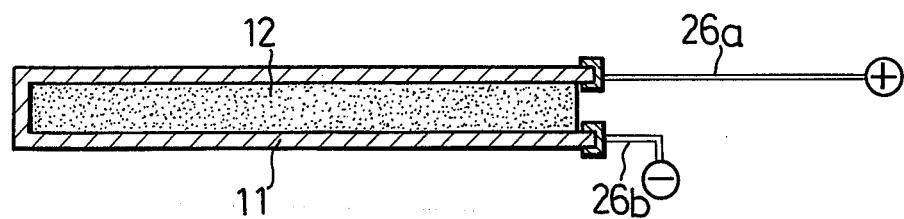
FIG. 4 is a longitudinal sectional view of a second embodiment of the ceramic heater according to the present invention.

FIG. 4 illustrates a second embodiment of the ceramic heater according to the present invention.

A U-shaped heater element 11 is disposed in contact with the outer surface of the rod-shaped supporting member 12. Both ends of the heater element 11 are electrically connected to a positive electrode and a negative electrode of a battery through stainless steel wires 26a, 26b, respectiely.

In operation, an electric current flows to the heater element 11 through the stainless steel wire 26a and then flows to the negative electrode through the stainless wire 26b.

In the fourth embodiment, the top end of the heater element 11 is made thin. The other structure of the fourth embodiment is substantially equal to that of the first embodiment.

The heater elements and the supporting members of the second to fourth embodiment are made of the material equal to that of the first embodiment. The operational effect of each of the second to fourth embodiment is substantially equal to that of the first embodiment.

In addition to the above embodiments, the heater element 11 may be accomodated within a groove formed in the supporting member 12 and the heater element 11 may be spirally wound round the supporting member 12.

The ceramic heaters of the second to fourth embodiments can be applied to the glow plug of a diesel engine. In addition, the ceramic heater of the present invention can be applied to various uses, for example, a fuel ignition heater which is used in a heating apparatus or the like.

In the preceding embodiments, the heater element is formed of a sintered body of a mixture composed of 10 to 70 mol % of $Si_3N_4$ with the remainder being $MoSi_2$. Instead, the heater element can be formed by sintering the mixture composed of the above mixture and 3 to 10 mol% of at least one material selected from the group consisting of $Al_2O_3$, a mixture of $Al_2O_3$ and $MgO$ and $MgAl_2O_4$. In this case, excellent oxidization resistance, and thermal shock resistance and high bending strength at a high temperature can be obtained and in addition, remarkably high sintering degree can be obtained.

By adding the above described additive, sufficiently high sintering degree can be obtained even by atmospheric sintering. Therefore, the heater element having a complex shape which cannot be produced by hot pressing, can be easily produced at a low cost.

Furthermore, in the preceding embodiments, a sintered plate made of $Si_3N_4$ or $Al_2O_3$ was used as the supporting member of the ceramic heater. Instead, a sintered plate made of the mixture of $Si_3N_4$ and $Al_2O_3$ can be also used. In this case, by changing the mixing ratio of $Si_3N_4$ within the above mixture in accordance with the mixing ratio of $Si_3N_4$ within the material for the heater element, the coefficient of thermal expansion of the supporting member can be made substantially equal to that of the heater element so that the heater element can be joined to the supporting member without generating cracks.

Table 4 shows the coefficient of thermal expansion of the sintered bodies made of the mixture of $Al_2O_3$ and $Si_3N_4$.

TABLE 4

| Composition ratio (mol %) | | | | | | | | | | | |
|---|---|---|---|---|---|---|---|---|---|---|---|
| $Al_2O_3$ | 100 | 90 | 80 | 70 | 60 | 50 | 40 | 30 | 20 | 10 | 0 |
| $Si_3N_4$ | 0 | 10 | 20 | 30 | 40 | 50 | 60 | 70 | 80 | 90 | 100 |
| Coefficient of thermal expansion (°C.$^{-1}$) | $7.7 \times 10^{-6}$ | $7.0 \times 10^{-6}$ | $6.2 \times 10^{-6}$ | $5.2 \times 10^{-6}$ | $4.8 \times 10^{-6}$ | $4.3 \times 10^{-6}$ | $3.8 \times 10^{-6}$ | $3.6 \times 10^{-6}$ | $3.3 \times 10^{-6}$ | $3.1 \times 10^{-6}$ | $2.8 \times 10^{-6}$ |

Figure 5:
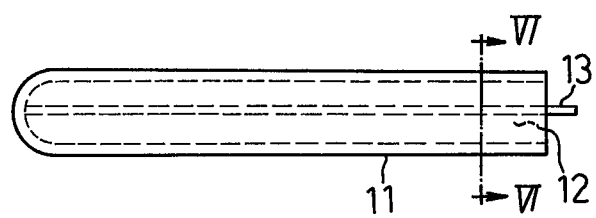
FIG. 5 is a front view of a third embodiment of the ceramic heater according to the present invention.
Figure 6:
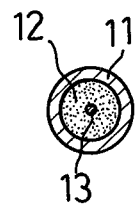
FIG. 6 is a cross sectional view taken along the line VI—VI of FIG. 5.

FIGS. 5 and 6 illustrate a third embodiment of the ceramic heater according to the present invention.

A cylindrical heater element 11 having a U-shaped cross section covers the outer peripheral portion of a rod-shaped supporting member 12.

Figure 7:
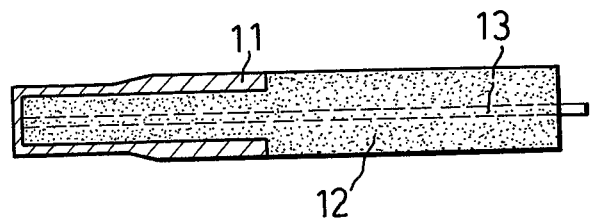
FIG. 7 is a longitudinal sectional view of a fourth embodiment of the ceramic heater according to the present invention.

FIG. 7 illustrates a fourth embodiment of the ceramic heater according to the present invention.

As is apparent from Table 4, the coefficient of thermal expansion is decreased as the composition ratio of $Si_3N_4$ is increased.

The coefficient of thermal expansion of the heater element which is made of the mixture containing 10 to 70 mol% of $Si_3N_4$ is ranged from $3.5 \times 10^{-6}$ °C.$^{-1}$ to $7.1 \times 10^{-6}$ °C.$^{-1}$ as shown in Table 2.

In order to make the coefficient of thermal expansion of the supporting member equal to the above range, the proper composition ratio of $Si_3N_4$ in the supporting member is selected from the range of 10 to 70 mol% as shown in Table 4.

For example, when the heater element is made of the mixture composed of 70 mol% of $MoSi_2$ and 30 mol% of $Si_3N_4$, the coefficient of thermal expansion thereof is $5.7 \times 10^{-6}$. In this case, the proper composition ratio of the mixture for forming the supporting member is about 75 mol% of $Al_2O_3$ and about 25 mol% of $Si_3N_4$.

As described above, in the ceramic heater of the present invention, the heater element is formed of a sintered body of a mixture composed of 10 to 70 mol% of $Si_3N_4$ with the remainder being $MoSi_2$. Therefore, the obtained heater element exhibits excellent oxidization resistance and thermal shock resistance and high bending strength at a high temperature.

The heater element having the above properties can be disposed on an outer surface of the ceramic heater without using an outer casing. Therefore, the obtained ceramic heater is superior in a rapidly heating property and the size of the ceramic heater can be made small.

Furthermore, since large temperature coefficient of resistance can be maintained, the obtained ceramic heater can be effectively used as a glow plug for a diesel engine, for example.

By adding at least one material selected from the group consisting of $Al_2O_3$, a mixture of $Al_2O_3$ and $MgO$ and $MgAl_2O_4$ to the mixture of $MoSi_2$ and $Si_3N_4$ and sintering the above material, the sintering degree of the obtained heater element can be increased. In this case, even by atmospheric sintering, sufficiently high sintering degree can be obtained so that the heater element having a complex shape can be formed at a low cost.

What is claimed is:

1. A ceramic heater comprising:
    a supporting member made of an insulating ceramic;
    a heater element made of an electrically conductive ceramic which is supported by said supporting member, said heater element comprising a pair of elements which are separately disposed on the outer surface of said supporting member; and
    an electric current supply means for supplying an electric current to said heater element, said electric current supplying means comprising a pair of metallic wire elements which are embedded within said supporting member, and one end of each said metallic wire elements is connected to each of said heater elements while the other end thereof is connected to a battery outside supporting member;
    said heater element being made of a non-oxidized sintered body of a mixture including 90 to 30 mol % of $MoSi_2$ and 10 to 70 mol % of $Si_3N_4$.

2. A ceramic heater according to claim 1, wherein:
    said heater element is supported on a surface of said supporting member so as to contact with the atmosphere to be heated.

3. A ceramic heater according to claim 1, wherein:
    said supporting member is composed of a pair of insulating ceramic plates which are integrally fixed to each other with said metallic wire elements sandwiched therebetween, by sintering;
    each of said heater elements is made of an electrically conductive ceramic plate and integrally fixed to an outer surface of each of said insulating ceramic plates by sintering; and
    one end of each of said metallic wire elements penetrates each of said insulating ceramic plates in the thickness direction thereof and is connected to each of said heater elements.

4. A ceramic heater according to claim 1, wherein:
    said mixture further includes 3 to 10 mol % of at least one material selected from the group consisting of $Al_2O_3$, a mixture of $Al_2O_3$ and $MgO$, and $MgAl_2O_4$.

5. A ceramic heater according to claim 1, wherein:
    said supporting member is made of a sintered body of the material selected from the group consisting of $Si_3N_4$, $Al_2O_3$ and a mixture of 10 to 70 mol% of $Si_3N_4$ with the remainder being $Al_2O_3$.

* * * * *